US 12,311,274 B2

United States Patent
Azmandian et al.

(10) Patent No.: US 12,311,274 B2
(45) Date of Patent: May 27, 2025

(54) ESPORTS SPECTATOR ONBOARDING

(71) Applicants: SONY INTERACTIVE ENTERTAINMENT LLC, San Mateo, CA (US); SONY INTERACTIVE ENTERTAINMENT INC., Tokyo (JP)

(72) Inventors: Mahdi Azmandian, San Mateo, CA (US); Victoria Dorn, San Mateo, CA (US); Sarah Karp, San Mateo, CA (US); Sudha Krishnamurthy, San Mateo, CA (US); Kristie Ramirez, San Mateo, CA (US)

(73) Assignees: SONY INTERACTIVE ENTERTAINMENT LLC; SONY INTERACTIVE ENTERTAINMENT INC., Tokyo (JP)

( * ) Notice: Subject to any disclaimer, the term of this patent is extended or adjusted under 35 U.S.C. 154(b) by 401 days.

(21) Appl. No.: 17/828,971

(22) Filed: May 31, 2022

(65) Prior Publication Data
US 2023/0381673 A1    Nov. 30, 2023

(51) Int. Cl.
A63F 13/86    (2014.01)
A63F 13/35    (2014.01)
H04L 67/306    (2022.01)

(52) U.S. Cl.
CPC .............. *A63F 13/86* (2014.09); *A63F 13/35* (2014.09); *H04L 67/306* (2013.01)

(58) Field of Classification Search
CPC .......... A63F 13/86; A63F 13/35; A63F 13/48; A63F 13/795; A63F 13/52; H04L 67/306
USPC ........................................................ 463/42
See application file for complete search history.

(56) References Cited

U.S. PATENT DOCUMENTS

| | | | |
|---|---|---|---|
| 7,446,772 B2 | 11/2008 | Wong et al. | |
| 9,782,678 B2 | 10/2017 | Long et al. | |
| 10,617,945 B1* | 4/2020 | George | G06F 3/0481 |
| 11,524,234 B2* | 12/2022 | Salik | A63F 13/5252 |
| 12,064,690 B2* | 8/2024 | Ikenaga | A63F 13/525 |
| 12,145,074 B2 | 11/2024 | Singh et al. | |

(Continued)

FOREIGN PATENT DOCUMENTS

| | | |
|---|---|---|
| CN | 117138356 | 12/2023 |
| WO | WO 2023/235102 | 12/2023 |

(Continued)

OTHER PUBLICATIONS

202310612571.X, Mahdi Azmandian, eSPORTS Spectator Onboarding, May 29, 2023.

(Continued)

*Primary Examiner* — Michael A Cuff
(74) *Attorney, Agent, or Firm* — Kilpatrick Townsend & Stockton LLP

(57) ABSTRACT

The present disclosure generally relates to providing virtual education and education to a user. More specifically, the present system relates to educating and onboarding spectators of electronic sports (eSports) events. The onboarding activities are used to further engage the spectators with the eSports event in general, as well as the game played during the eSports event. In other aspects, the eSports onboarding activity may be modified based on the type of game being played, the user's experience with the specific game or game genre, and other user preferences.

21 Claims, 9 Drawing Sheets

(56) References Cited

U.S. PATENT DOCUMENTS

| | | |
|---|---|---|
| 2006/0098013 A1 | 5/2006 | Wong et al. |
| 2009/0143141 A1 | 6/2009 | Wells et al. |
| 2010/0041457 A1 | 2/2010 | Cook et al. |
| 2011/0151974 A1 | 6/2011 | Deaguero |
| 2013/0324247 A1 | 12/2013 | Esaki et al. |
| 2014/0004951 A1 | 1/2014 | Kern et al. |
| 2015/0355826 A1 | 12/2015 | Gibbons et al. |
| 2015/0360133 A1 | 12/2015 | MacCallum et al. |
| 2016/0358082 A1* | 12/2016 | Quintero ............... G06N 5/04 |
| 2017/0001111 A1 | 1/2017 | Willette et al. |
| 2018/0189077 A1* | 7/2018 | Gupta ................. G06F 9/453 |
| 2019/0046886 A1 | 2/2019 | George et al. |
| 2019/0262723 A1 | 8/2019 | Trombetta et al. |
| 2020/0009458 A1 | 1/2020 | Onda et al. |
| 2020/0179809 A1 | 6/2020 | Lin et al. |
| 2021/0038998 A1* | 2/2021 | Tallarico ............. A63F 13/214 |
| 2021/0113926 A1 | 4/2021 | Ziaja et al. |
| 2021/0217245 A1* | 7/2021 | Akman ............... A63F 13/285 |
| 2021/0241507 A1* | 8/2021 | Kazem ................ G06F 40/237 |
| 2021/0331072 A1* | 10/2021 | Gibbon ................ A63F 13/33 |
| 2021/0346811 A1 | 11/2021 | Khan et al. |
| 2022/0054945 A1 | 2/2022 | Salik |
| 2022/0062778 A1 | 3/2022 | Eatedali et al. |
| 2022/0168639 A1* | 6/2022 | Nelson ................. A63F 13/57 |
| 2022/0203234 A1* | 6/2022 | Olabode .............. A63F 13/795 |
| 2022/0219091 A1 | 7/2022 | Kumah et al. |
| 2023/0381674 A1 | 11/2023 | Singh et al. |
| 2024/0024787 A1 | 1/2024 | Bean et al. |

FOREIGN PATENT DOCUMENTS

| | | |
|---|---|---|
| WO | WO 2023/235103 | 12/2023 |
| WO | WO 2024/019822 | 1/2024 |

OTHER PUBLICATIONS

PCT/US2023/020990, Mahdi Azmandian, eSPORTS Spectator Onboarding, May 31, 2022.

PCT/US2023/020991, Lachmin Singh, Triggering Virtual Help or Hindrance Based on Audience Participation Tiers, May 4, 2023.

PCT/US2023/024036, Celeste Bean, Spectator Participation in Esports Events, May 31, 2023.

U.S. Appl. No. 17/828,974, Final Office Action mailed Feb. 29, 2024.

U.S. Appl. No. 17/870,021, Office Action mailed Mar. 14, 2024.

PCT/US23/20990, International Search Report mailed Jul. 27, 2023 (9 pages).

PCT/US23/20991, International Search Report mailed Jul. 28, 2023 (14 pages).

PCT/US2023/024036, International Search Report mailed Aug. 25, 2023 (22 pages).

U.S. Appl. No. 17/828,974, Office Action mailed Jul. 20, 2023.

U.S. Appl. No. 17/870,021, Final Office Action mailed Jun. 24, 2024.

U.S. Appl. No. 17/870,021, Office Action dated Oct. 11, 2024.

U.S. Appl. No. 18/917,167, US, Lachmin Singh, Triggering Virtual Help or Hindrance Based on Audience Participation Tiers, Oct. 16, 2024.

* cited by examiner

ESPORTS SPECTATOR ONBOARDING

BACKGROUND OF THE INVENTION

1. Field of the Disclosure

The present disclosure generally relates providing virtual education and engaging to spectators of eSport events. More specifically, the present system relates to educating and onboarding spectators of electronic sports (eSports) events.

2. Description of the Related Art

Playing video games in a competitive environment may be referred to as electronic sports or "eSports." Like non-electronic sports, the participants or competitors compete in matches and even tournaments of several matches. Such eSports matches and tournaments take place within in-game environments not only be accessible to the players themselves, but also to non-playing spectators. In some instances, eSports tournaments may be associated with in-person events similar to live sporting events, such as tailgate parties and other activities that engage a fan base. In addition, remote spectators may be provided with a digital media stream (e.g., live or recorded) of the eSports events.

Over time, eSports has grown into a large entertainment industry with millions of spectators. Despite this growth in spectatorship, eSports streams still have difficulty reaching potential new fans and retaining casual spectators. This is often due to the complexity of the eSport game, the fast-paced nature of the game, and the use of unique terminology or slang associated with the eSport event and its broadcast.

There is, therefore, a need to provide a more dynamic and education and onboarding experience for spectators in a digital environment of eSports streams.

SUMMARY OF THE CLAIMED DISCLOSURE

A method for educating or onboarding spectators or spectators of an eSport event on an entertainment device is disclosed. The method includes receiving user data associated with spectator's use of the entertainment device from a stored user profile. The method further includes receiving an onboarding activity request from the entertainment device and generating an onboarding activity associated with the onboarding activity request. The onboarding activity is provided to the entertainment device for access by the spectator. Further, the method includes storing data associating the onboarding activity with the user profile.

A system for educating or onboarding spectators of an eSport event on an entertainment device is disclosed. The system includes a memory and a processor that executes instructions stored in memory, wherein execution of the instructions by the processor causes the processor to receive user data associated with spectator's use of the entertainment device from a stored user profile. The processor also receives an onboarding activity request from the entertainment device and generates an onboarding activity associated with the onboarding activity request. The instructions further cause the processor to provide the onboarding activity to the entertainment device for access by the spectator and store data associating the onboarding activity with the user profile.

A non-transitory computer-readable storage medium, having embodied thereon a program executable by a processor to perform a method for educating or onboarding spectators of an eSport event on an entertainment device is disclosed. The method includes receiving user data associated with spectator's use of the entertainment device from a stored user profile. The method further includes receiving an onboarding activity request from the entertainment device and generating an onboarding activity associated with the onboarding activity request. The onboarding activity is provided to the entertainment device for access by the spectator. Further, the method includes storing data associating the onboarding activity with the user profile.

DETAILED DESCRIPTION

The present disclosure describes methods and systems for educating and onboarding spectators or other spectators of eSports events. Instead of merely distributing the same digital stream of an eSports event (e.g., match or other tournament-related event) to all remote spectators—whether as a real-time stream for live spectating or as a recorded stream for later viewing on demand—various features associated with eSports gaming network may be used to educate and onboard spectators of the eSports events to promote a more engaging spectator experience. As disclosed herein, a wide variety of engaging techniques including mini-games may be provided to the spectator.

As referred to herein, an eSports event is inclusive of any type of event associated with eSports play and tournaments, including the actual competitive matches involving a number of different video game competitors and affiliated events. Depending on the parameters of the tournament, the video game(s) involved can include a wide variety of genres and game titles. Some tournaments are further associated with affiliated events, which may take place in in-person settings, as well as digital settings. Thus, spectators can attend and view live eSports events much like other typical sports (e.g., football, basketball) in designated arenas or stadiums. Spectators can also view these eSports events remotely via streams distributed to their respective computing devices for display.

Embodiments of the present invention may further incorporate and automate features to educate new and casual eSport spectators.

The systems and methods may also be stored or encoded on non-transitory computer-readable storage medium.

As used herein, a "broadcast," "presentation," "data display," "event stream," or "data stream" may be used interchangeably to refer to the eSports presentation made available to spectators. An eSports match, for example, may further include a number of different streams, as well as different views or perspectives within a stream. Furthermore, during the event stream, spectators may be exposed to a wide variety of terms and phrases including slang that is unique to the eSport players and/or the game played. Furthermore, spectators may be exposed to a wide variety of skills and game play tactics that may aid the spectators in their own games.

Figure 1:
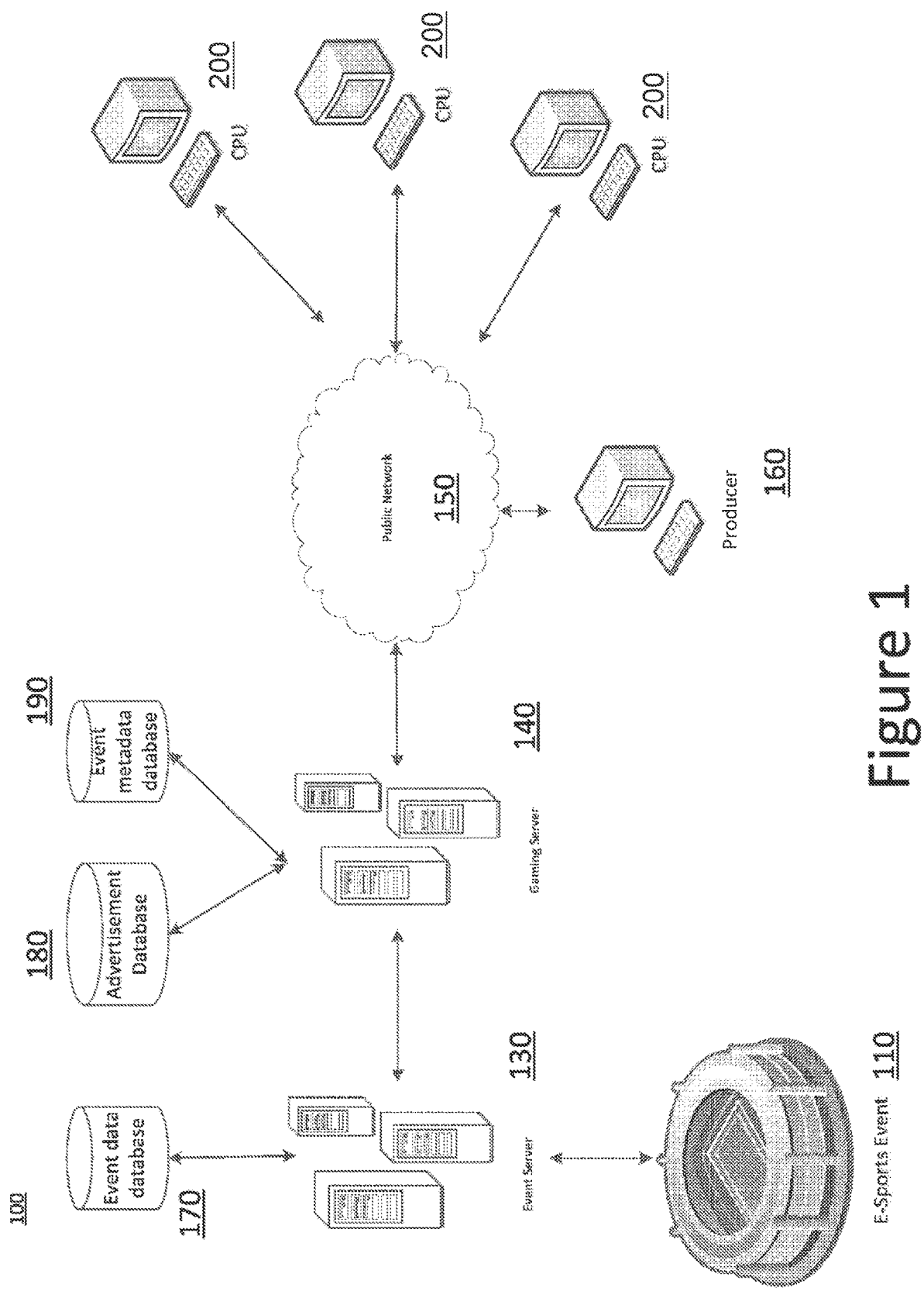
FIG. 1 illustrates an exemplary network environment in which a system for dynamically defining and customizing digital streams may be implemented.

A system 100 for providing educational and customized onboarding engagement in an eSports event is illustrated in FIG. 1. The customized onboarding can be implemented in a wide variety of generated displays and activities to educate and further entertain spectators of the eSports event. The system 100 would also facilitate the creation or generation of customized tutorials and or mini-games for the spectators viewing the eSports events to be played on their respective user computing devices 200.

As illustrated, the system 100 provides distribution of eSports event data from an eSports event 110 to various remote users or spectators on their respective computing devices 200. The distribution may include, for example, live streams from which remote spectators may view on their respective computing devices 200. The eSports event data from the eSports event 110 may be collected and processed at event server 130. The eSports event data from the eSports event 110 is then transmitted to the gaming server 140 that performs the modifications to the eSports event data. Described in further detail below, the modifications to the eSports event data at the gaming server 140 may include generating new, customized, and/or composite data streams in real time or near real time using the eSports event data.

After any numbers of modifications have been performed by the gaming server 140, the eSports event data can then be provided to the public network 150 where spectators on their computing devices 200 can receive and view the eSports event display. Exemplary computing devices 200 may include laptops, desktops, mobile devices, and tablets. The spectators may be able to download the eSports event data directly to their computing devices 200 using various software applications installed on the computing devices 200. In other situations, web-based applications or streaming services may provide user access to and viewing of the eSports event data. Spectators may then be able to view the eSports event data as a video stream inclusive of all the modifications such as statistics, commentators, crowd interactions, and advertisement added by the gaming server 140.

The event server 130 obtains eSports data from an eSports event 110. The eSports event 110 can be a video game competition held at a predetermined location such as an arena or stadium. The eSports event data obtained from the eSports event 110 would include videography and gameplay information associated with each of the video game competitors participating within the eSports event 110.

As an example, if the eSports event 110 were a tournament playing a head-to-head video game based on American football, baseball, or soccer, the eSports event data would be the gameplay data associated with each of the players during each game. The gameplay data being obtained from the eSports event 110 may include video gameplay information associated with each player's individual interactions with respect to the videogame such as each player's point of view as they play the game and game state within the video game at any given moment in time. The gameplay data may also include different player's inputs (e.g., keyboard and mouse inputs) and communications (e.g., voice and text chat) between teammates or opponents during the course of the match as well. The event server 130, in the process of obtaining gameplay data for each player, can also obtain video recordings of each player during the course of the match. The video recordings may be recordings of each player's screen as the video game match is occurring. The video recording may also be an in-game perspective of the video game match using features (e.g., spectator camera perspectives) associated with the video game. This video data can be provided to the gaming server 140 to be used in the distribution of the eSports event (or used to supplement rendered gameplay video from the gaming server 140) sent to the spectators on their computing devices 200.

The event server 130 may also be capable of obtaining additional information related to the video game being played during the eSports event 110. For example, microphones, cameras, and/or sensors may be used to capture information about the audience attending the live eSports event 110. Furthermore, any audio and video related to on-site commentators can also be captured by the event server 130. Additionally, the gameplay data captured by the event server 130 may also include additional points of view that could be available or otherwise generated during the game, even those not selected by the player. For example, if Player A prefers to play using a third-person point of view, the game data for various first person points of view may also be received at the event server 130. These alternate points of view, including other first person points of views or third person points of views, among others, ordinarily generated by the game, may be captured by the event server 130 for subsequent distribution, manipulation, or storage by the gaming server 140.

The event server 130 can store the information obtained from the eSports event data in an event database 170. The event database 170 may be used to store the video data as well as any gameplay information retrieved from the event server 130. The information stored within the event database 170 can be accessed by the gaming server 140.

The gaming sever 140 generates the eSports event data that will be distributed to spectators on their computing devices 200. The distribution of eSports event data may generally include a video recording of the eSports event 110 along with additional information and commentary aimed at immersing the user when viewing the eSports event. The video recording may be obtained directly from the eSports event 110 via the event server 130. It may also be possible for the gaming server 140 to re-render game states of the video game using the extract gameplay data from the event server 130. For this situation, the gaming server 140 may retrieve stored video game assets associated with the video game of the eSports event 110. By using the extracted gameplay data and the stored video game assets, the gaming server 140 may be able to re-create or generate customized video of the video game as if it was recorded directly via the gaming server 140.

The gaming server 140, using the eSports event data coming from the event server 130, can then extract relevant information the eSports data streams that spectators will view on their computing devices 200. The types of extracted information obtained by the gaming server 140 can be the information that spectators may find interesting.

In yet another aspect, the gaming server 140 is capable of using the collected information from the eSports event from the different players in order to reconstruct a unique view if such view is not available within the video game. This may be done by using the collected information from the event server 130 and the stored game assets available to the gaming server 140. The gaming server 140 may be able to re-render what the state of the video game at a given point in time and then focus re-rendering certain portions based on the desired focus. This allows the gaming server 140 to provide a different (and possibly comprehensive) view of the video game using all the information available in situations where only partial information may be known by each individual participant (e.g., eliminating "fog of war" effects). In various aspects, the gaming server 140 generates or renders exclusive video or data streams that may not be produced by the eSports producer.

The public network 150 facilitates communication of the eSports event data from the gaming server 140 with the plurality of user computing devices 200. The public network 150 can also include one or more private networks, such as, a local area network (LAN), a wide area network (WAN), or a network of public/private networks, such as the Internet. The Internet is a broad network of interconnected computers and servers allowing for the transmission and exchange of Internet Protocol (IP) data between user devices connected through a network service provider. Examples of network service providers include the public switched telephone network, a cable service provider, a provider of digital subscriber line (DSL) services, or a satellite service provider.

Producers 160 are also able to affect how the distribution of the eSports event data is performed. Producers 160 are able to interact with the event server 130 and gaming server 140 using their respective computing devices. For example, producers 160 may create, run, and manage the eSports event. Furthermore, modifications to how the distribution of the eSports event data are sent to the remote spectators on their computing devices 200 can also be implemented by the producers 160 such as identifying what additional video streams should be incorporated and what additional information (e.g., statistics) should be shown during the distribution of the eSports event data. The Producers 160 may also select a particular video stream of the multitude of video streams available for broadcast or streaming.

The event data database 170 may be associated with the event server 130 and used to store the eSports event data obtained from the eSports event 110. The event server 130 may be capable of obtaining a variety of different types of eSports event data from the eSports event 110 inclusive of video recordings, audio, and text-based information. As previously indicated, the event data database 170 may store additional video stream views or perspectives of the game not selected by the players.

The eSports event data obtained from the eSports event 110 can be subsequently stored in the event data database 170. In some situations, the information stored in the event data database 170 can be accessed at a future time and date for viewing a previously eSports event on-demand after the live event has been completed. Although the event server 130 can directly transmit the eSports event data obtained from the eSports event 110, it may also be possible that the gaming server 140 access the event data database 170 for some or all the information that will be distributed to the spectators.

The video stream database 180 is used to store a plurality of different video streams, including the data streams of the eSports event data being provided to the various spectators, by the gaming server 140.

The event metadata database 190 is used to store the metadata associated with the eSports event streams being provided to the user computing devices 200. The gaming server 140 can generate the metadata to indicate what additional information or views can be incorporated with an event data stream for a particular spectator. The metadata is associated with the streams so that additional views available or the option to generate a customized view that may be used in one or more onboarding activity. The metadata can also be used to link spectator reactions or other inputs at the spectator computing devices 200 to the selection or automatic display of certain video streams or onboarding activities identified through machine learning.

Each metadata generated by the gaming server 140 may be assigned a unique identification that is linked with eSports event data used in a stream and/or a unique user identification. Because the metadata is uniquely identified to be associated with event data and/or a unique user and is used to indicate where and when the additional information is incorporated into the event data stream, it is not necessary for the gaming server 140 to store multiple entire event presentations including the additional information obtained from the eSports event 110 or multiple instances of the same user-created views. Instead, whenever eSports event data is used in a stream, the corresponding metadata associated with the eSports various view streams can be retrieved from the event metadata database 190 via the gaming server 140 querying the event metadata database for any relevant metadata.

Figure 2:
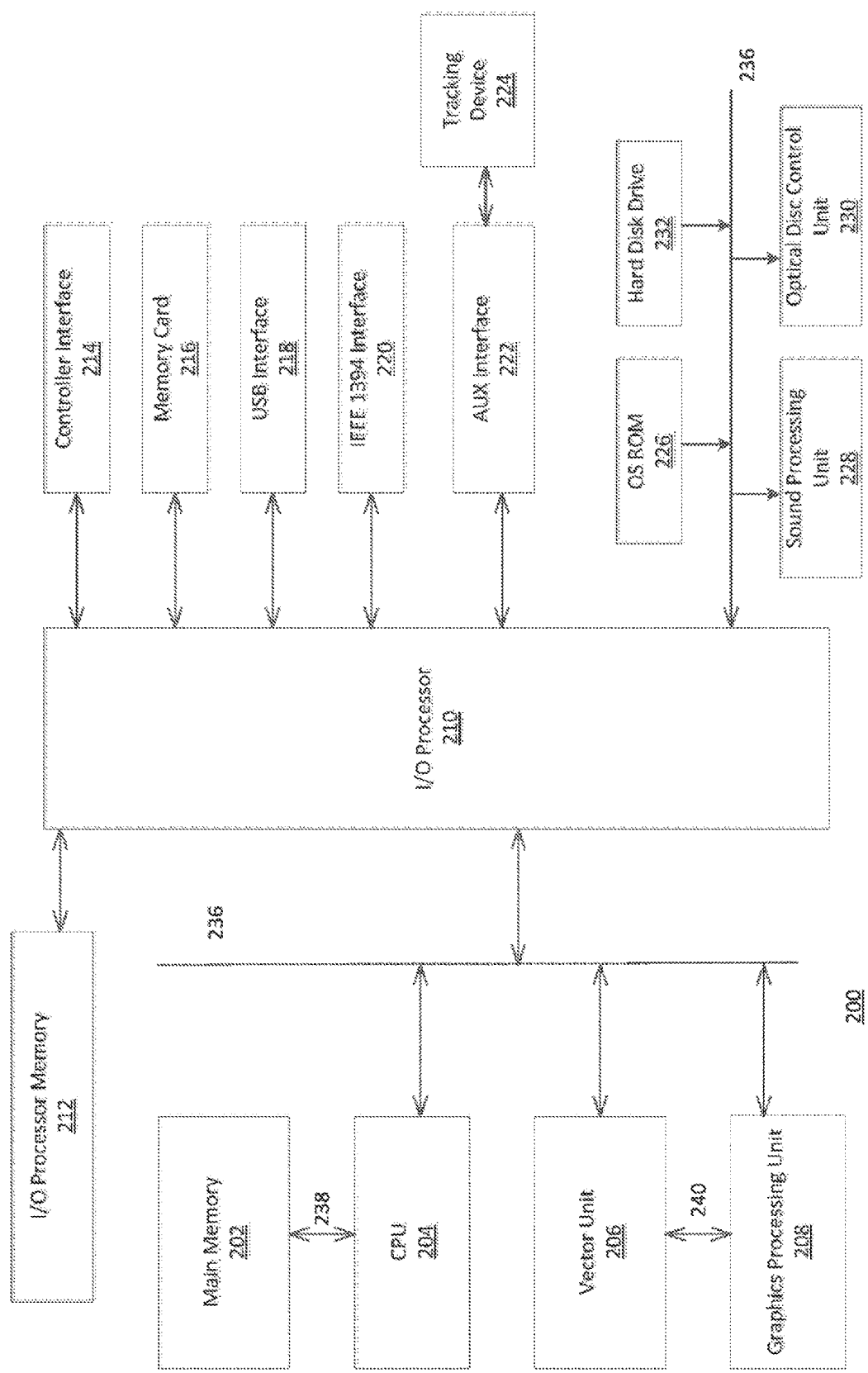
FIG. 2 is an exemplary user device that may be used in context of the system of FIG. 1.

FIG. 2 is an exemplary user device 200 that may be used in context of the system of FIG. 1. The user computing device 200 may correspond to user computing device 200 of FIG. 1 and may be inclusive of desktop, laptop, tablet, mobile device, console gaming system, such as Playstation® 4 or Playstation® 5, etc. The user computing device 200 is a device that the user can utilize to facilitate carrying out features of the present disclosure pertaining to the dynamic and customized engagement and views for the eSports event. In particular, the user computing device 200 allows the user to view the distribution of eSports event data remotely. The user computing device 200 would facilitate the user viewing of the eSports event data via a display associated with the user computing device 200.

The user computing device 200 may include various elements as illustrated in FIG. 2. It should be noted that the elements are exemplary and that other aspects may incorporate more or less than the elements illustrated. With reference to FIG. 2, the user computing device 200 includes a main memory 202, a central processing unit (CPU) 204, at least one vector unit 206, a graphics processing unit 208, an input/output (I/O) processor 210, an I/O processor memory 212, a controller interface 214, a memory card 216, a Universal Serial Bus (USB) interface 218, and an IEEE interface 220, an auxiliary (AUX) interface 222 for connecting a tracking device 224, although other bus standards and interfaces may be utilized. The user computing device 200 further includes an operating system read-only memory (OS ROM) 226, a sound processing unit 228, an optical disc control unit 230, and a hard disc drive 232, which are connected via a bus 234 to the I/O processor 210. The user computing device 200 further includes at least one tracking device 224.

The tracking device 224 may be a camera, which includes eye-tracking capabilities. The camera may be integrated into or attached as a peripheral device to user computing device 200. In typical eye-tracking devices, infrared non-collimated light is reflected from the eye and sensed by a camera or optical sensor. The information is then analyzed to extract eye rotation from changes in reflections. Camera-based trackers focus on one or both eyes and record their movement as the spectator looks at some type of stimulus. Camera-based eye trackers use the center of the pupil and light to create corneal reflections (CRs). The vector between the pupil center and the CR can be used to compute the point of regard on surface or the gaze direction. A simple calibration procedure of the spectator is usually needed before using the eye tracker.

Alternatively, more sensitive trackers use reflections from the front of the cornea and that back of the lens of the eye as features to track over time. Even more sensitive trackers image features from inside the eye, including retinal blood vessels, and follow these features as the eye rotates.

Most eye tracking devices use a sampling rate of at least 30 Hz, although 50/60 Hz is most common. Some tracking devises run as high as Hz, which is needed to capture detail of very rapid eye movement.

A range camera may instead be used with the present disclosure to capture gestures made by the user and is capable of facial recognition. A range camera is typically used to capture and interpret specific gestures, which allows a hands-free control of an entertainment system. This technology may use an infrared projector, a camera, a depth sensor, and a microchip to track the movement of objects and individuals in three dimensions. This user device may also employ a variant of image-based three-dimensional reconstruction.

The tracking device 224 may include a microphone integrated into or attached as a peripheral device to user computing device 200 that captures voice data. The microphone may conduct acoustic source localization and/or ambient noise suppression. The microphones may be usable to receive verbal instructions from the user to schedule, retrieve, and display content on the user computing device 200.

Alternatively, tracking device 224 may be the controller 902 of the user device 200. The controller may use a combination of built-in accelerometers and infrared detection to sense its position in 3D space when pointed at the LEDs in a sensor nearby, attached to, or integrated into the console of the entertainment system. This design allows spectators to control functionalities of the user computing device 200 with physical gestures as well as button-presses. The controller connects to the user computing device 200 using wireless technology that allows data exchange over short distances (e.g., 30 feet). The controller may additionally include a "rumble" feature (i.e., a shaking of the controller during certain points in the game) and/or an internal speaker.

The controller may additionally or alternatively be designed to capture biometric readings using sensors in the remote to record data including, for example, skin moisture, heart rhythm, and muscle movement.

As noted above, the user computing device 200 may be an electronic gaming console. Alternatively, the user computing device 200 may be implemented as a general-purpose computer, a set-top box, or a hand-held gaming device. Further, similar user devices may contain more or less operating components.

The CPU 204, the vector unit 206, the graphics processing unit 208, and the I/O processor 210 communicate via a system bus 236. Further, the CPU 204 communicates with the main memory 202 via a dedicated bus 238, while the vector unit 206 and the graphics processing unit 208 may communicate through a dedicated bus 240. The CPU 204 executes programs stored in the OS ROM 226 and the main memory 202. The main memory 202 may contain pre-stored programs and programs transferred through the I/O Processor 210 from a CD-ROM, DVD-ROM, or other optical disc (not shown) using the optical disc control unit 232. The I/O processor 210 primarily controls data exchanges between the various devices of the user device 200 including the CPU 204, the vector unit 206, the graphics processing unit 208, and the controller interface 214.

The graphics processing unit 208 executes graphics instructions received from the CPU 204 and the vector unit 206 to produce images for display on a display device. For example, the vector unit 206 may transform objects from three-dimensional coordinates to two-dimensional coordinates and send the two-dimensional coordinates to the graphics processing unit 208. Furthermore, the sound processing unit 230 executes instructions to produce sound signals that are outputted to an audio device such as speakers (not shown).

Figure 9:
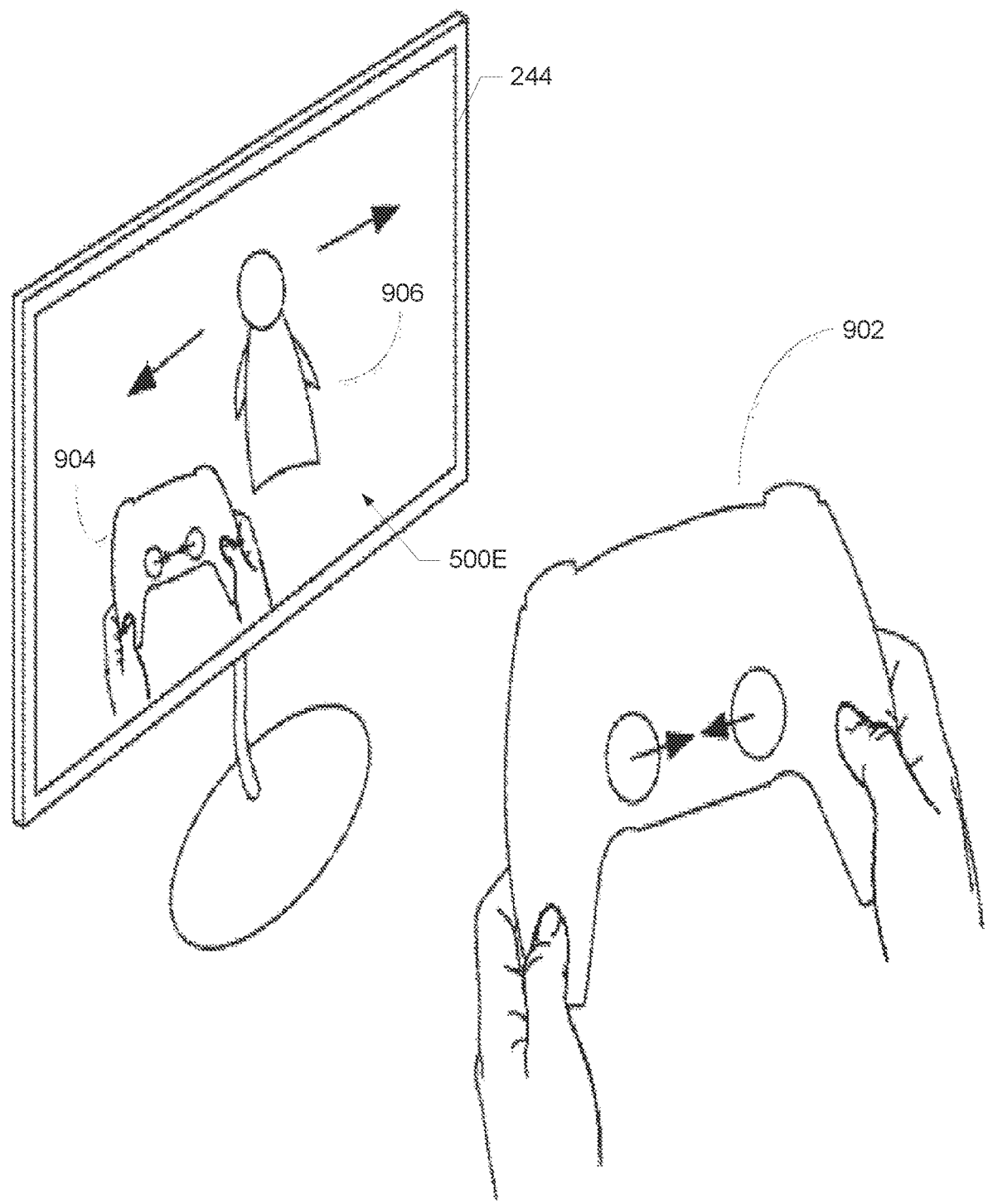
FIG. 9 is an illustration of an onboarding activity as displayed to an eSports spectator, according to one embodiment.

A user of the user computing device 200 provides instructions via the controller interface 214 to the CPU 204. For example, the user may instruct the CPU 204 to store certain information on the memory card 216 or instruct the user device 200 to perform some specified action. Example controllers associated with the controller interface 214 may include a touch-screen, keyboards, and game controllers, such as the controller 902, as shown in FIG. 9.

Other devices may be connected to the user computing device 200 via the USB interface 218, the IEEE interface 220, and the AUX interface 222. Specifically, a tracking device 224, including a camera or a sensor may be connected to the user computing device 200 via the AUX interface 222, while a controller may be connected via the USB interface 218. In some aspects, a VR headset or related hardware equipment may be communicatively coupled to computing device 200 via one or more computing interfaces. Hardware and related software for implementing an augmented reality (AR) experience may similarly be coupled to computing device 200 via one or more computing interfaces.

Figure 3:
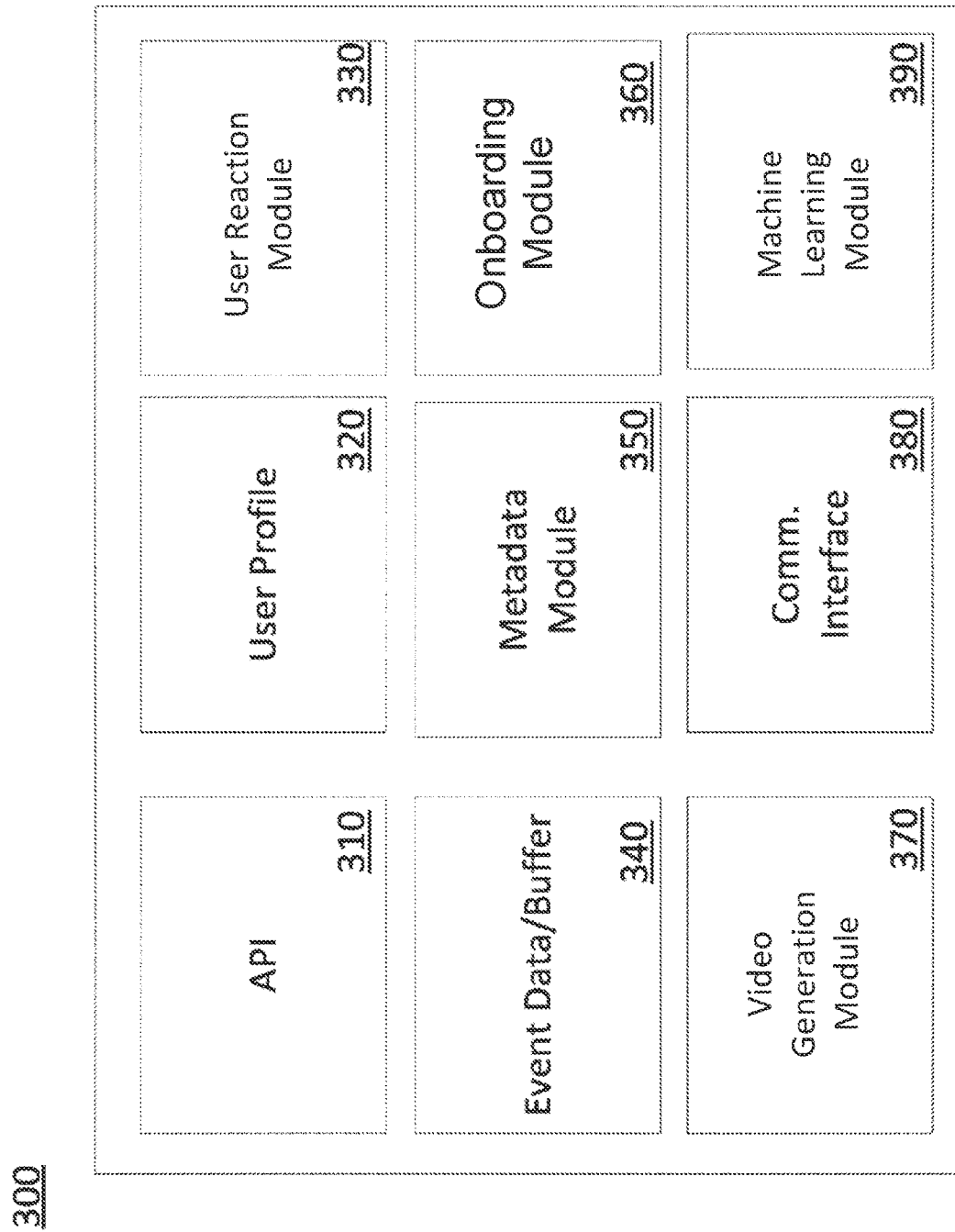
FIG. 3 is a block diagram of an exemplary gaming server that may be used in context of the system of FIG. 1.

FIG. 3 is a block diagram of an exemplary gaming server 300 that may be used in context of the system of FIG. 1. The gaming server 300 may corresponding to gaming server 140 of FIG. 1 and include a plurality of different features that facilitates the dynamic and customized engagement and views in an eSports event. As illustrated in FIG. 3, the gaming server 300 may include an application program interface (API) 310, user profiles 320, a user reaction module 330, eSports event data storage and buffer 340, metadata module 350, an eSport onboarding module 360, a view generation module 370, communication interfaces 380, a machine learning module 390. Details regarding each of these features will be provided below in further detail.

The application program interface (API) 310 allows an entity to manage how eSports event data is distributed to remote spectators. Using the API 310, an administrator (e.g., developer, tournament organizer) can customize and modify how the gaming server operates with respect to what data is retrieved from the event server, what data is processed and generated from the event server, and how the eSports event data is distributed to the remote spectators. For example, the administrator (through the use of the API 310 can create and/or modify the information associated with the various user profiles 320 and user reaction module 330 that indicate the types of additional or substitute content that will be implemented into the distribution of the eSports event data to the remote spectators.

Furthermore, any updates needed with respect to the features associated with the gaming server can be implemented using the API 310 as well. For example, various video games may obtain patches and or other fixes during the course of an eSports event or between eSports events. The API 310 can be used to modify data generated or used by the eSport onboarding module 360 to incorporate those patches and other fixes as well.

The user profile 320 is used to store information about each remote spectator. Remote spectators may need to create their own profile and sign in to their respective profiles before being allowed to access/view eSports event data. The user profiles 320 would be used by the gaming server 300 to identify the types of modifications to the eSports event stream that can be carried out to better immerse the user in the viewing experience.

Figure 6:
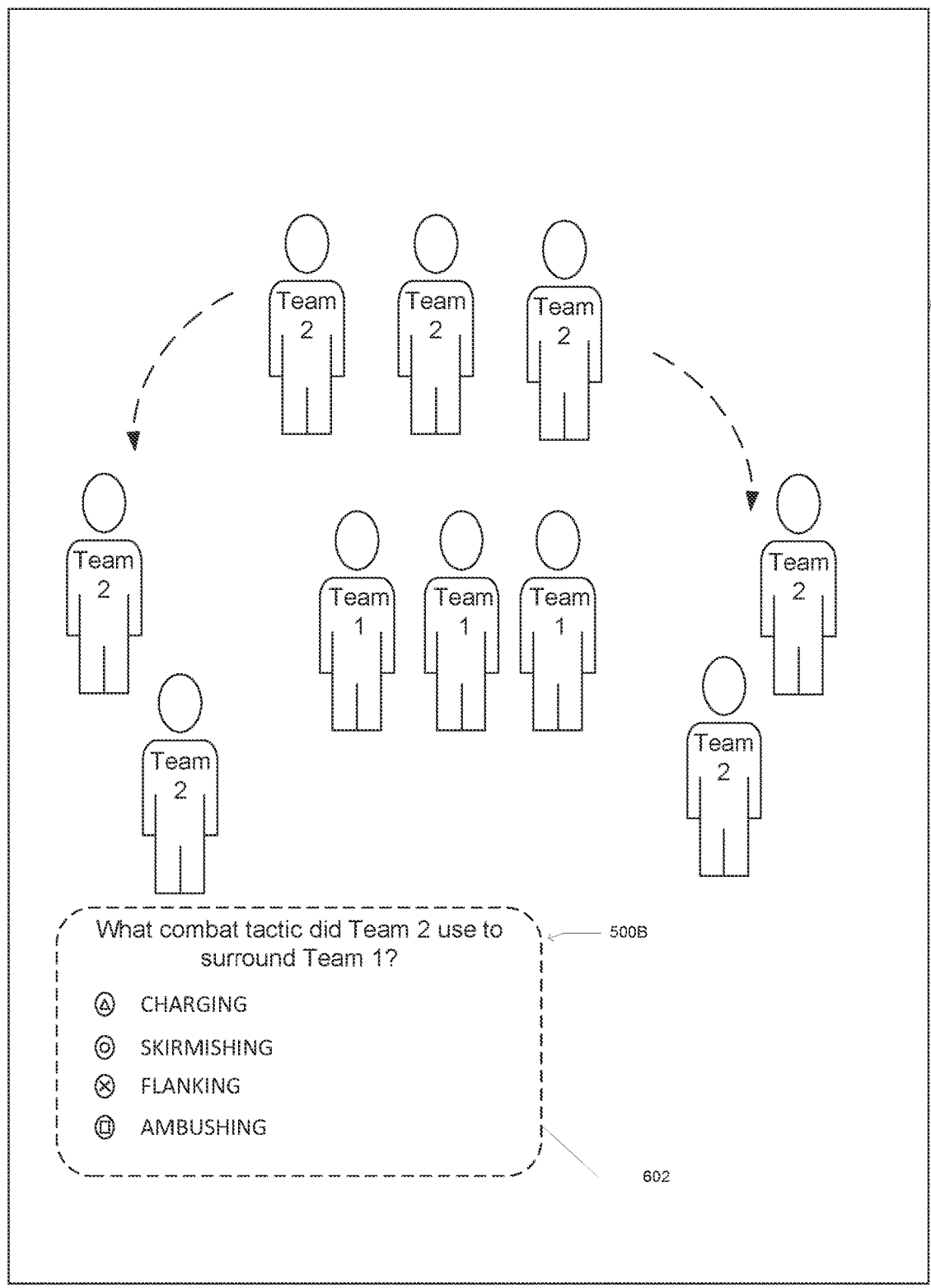
FIG. 6 is an illustration of an onboarding activity as displayed to an eSports spectator, according to one embodiment.

The user profile 320 may also store user preferences about the distribution of the eSports event data being remotely viewed on their user computing device. For example, the user profile 320 can customize preferred views, preferred additional information to be displayed, preferred audio, and even preferred onboarding activities. For example, when the spectator streams an eSports event for a particular genre, the user profile 320 may be referenced to determine that the spectator prefers a particular type of onboarding activity such as a trivia game, as shown in FIG. 6, or a video walkthrough. The user profile 320 can be updated anytime by the respective user through their user computing device.

The user profile 320 can also store information about the user computing devices. This information can be used by the gaming server 300 to identify how the eSports event data can be processed and transmitted. This may identify, for example, the format the eSports event data would need to be transmitted in order to be compatible with the user computing device. With all the information about the user stored in the user profile 320, the gaming server 300 would be able to identify the appropriate version of the eSports event data to be distributed.

The user reaction module 330 receives and processes spectator-generated content related to a spectator's reaction to the eSport event. The reactions may also include physical movements or facial expressions captured by the tracking device 224. During viewing of the eSport event, the user reaction module 330 captures data from the spectator's respective client devices 200. In one aspect, the spectator reaction module 320 may identify a type of reaction made by the spectator and classify the same as a piqued curiosity, disagreement, or outrage, among others. In this aspect, the spectator reaction module may identify a spectator's reaction to the gameplay or commentary of the eSport event, such as a raised eyebrow, a confused expression, or interacting with another mobile device, as a reaction indicating further interest or a lack there of in the streamed eSport event.

The user reaction module 330 may capture a user reaction that signals confusion or doubt in response to gameplay, commentary, or other information provided during the eSport event. In particular, various hardware sensors, including but not limited to the tracking device 224 may detect user confusion in a variety of ways. In one example, a camera may record facial expressions, hand gestures, and body language associated with confused. In another example, a microphone may record user speech associated with confusion emotion or words spoken at an increased volume. In yet a different example, a haptic feedback device or gyroscope embedded in a controller may receive rapid changes in input associated with banging, throwing, shaking, or otherwise turbulent motions and inputs associated with an exasperated emotion.

The eSports event data storage and buffer 340 is used to store eSports event data coming from the event server. The eSports event data storage and buffer 340 may be used to store the eSports data temporarily until it can be processed and used in the distribution of the eSports event data.

The metadata module 350 generates metadata for the eSports event data being distributed to the remote spectators on their computing devices. The generated metadata identifies the types of information to be incorporated into the distribution of the eSports event data as well when that information should be presented.

The metadata generated by the metadata module 350 is uniquely associated with the distribution of the eSports event data. This can be performed, for example, by providing unique labels that connect one with the other. In this way, the eSports event data used in distribution to the remove spectators can be stored separately from the metadata that is generated. However if the eSports event data is ever retrieved and viewed by the user, the corresponding metadata can be queried and applied accordingly.

The eSports onboarding module 360 may be stored on and executed from the event data database 170, the user devices 200, the event servers 130 or the gaming servers 140. The eSports onboarding module 360 is engaged by a spectator on a user device 200, that may include, according to various embodiments, a digital display 244 such as a television, projector, monitor, smartphone, virtual reality (VR) head-mounted display or handheld device and may incorporate one or more physical input devices such as a touchscreen, remote, controller, joystick, or mouse and keyboard. Further, data associated with the spectator's user profile may be relevant to the generation of onboarding activities generated by the eSports onboarding module 360. The user profiles may also contain and store user onboarding progress and preferences for information delivered by the eSports onboarding module 360.

The educational onboarding activities 500A-E generated, curated, and/or otherwise provided by the eSports onboarding module 360 may be customized to each spectator such that they may be presented in a manner different than the onboarding activities provided to another user. Moreover, because a user may possess different levels of knowledge or familiarity with eSport games or events from one genre to the next and further from title to title. For example, the user may have little familiarity to a particular one game genre or title (e.g., first-person shooter games) and greater familiarity with a different game genre or title (e.g., sport games). In various embodiments, personalized onboarding may be provided by way of pop-ups, overlays, mini-games, video clips or audio clips, among others. Thus, the personalized onboarding for the former may utilize different audio-visuals than personalized onboarding the latter.

In some implementations, the eSports onboarding module 360 may also refer to user profiles of the spectators in order to provide onboarding activities and onboarding data in a format preferred by the spectator. In another embodiment, the onboarding module 360 refers to the spectator user profile to provide onboarding data that relates the present game title to another game title or genre. For example, the onboarding activity 500A-E provided by the onboarding module 360 may relate a term, objective, or other game tutorial from one game to another game that the spectator is more familiar with based on the user profile. As such, the eSports onboarding module 360 may further continually update the user profile and refine the onboarding activities 500A-E over time as new data is received that confirms or belies such predictions. Thus, eSports onboarding module 360 may have an updated user profile to use in customizing in-game education in a way that relevant and useful to the user.

The communication interface 380 facilitates communication between the various features of the system of FIG. 1. For example, this would facilitate transmission of information from the event server to the gaming server as well as from the gaming server to the remote spectators. The communication interface 380 also facilitates user interactions (e.g., developer, commentators) with the gaming server.

The machine learning module 390 may be an internal or external artificial intelligence (AI) or other machine learning system trained using any suitable machine learning model, system, or dataset to predict or identify likely user preferences and likely actions in the video game, among others. The machine learning module may work in conjunction with the onboarding module 360 to select existing onboarding activities 500A-E or generate new onboarding activities in near real-time based upon the video and audio streamed during the eSport event.

Figure 4:
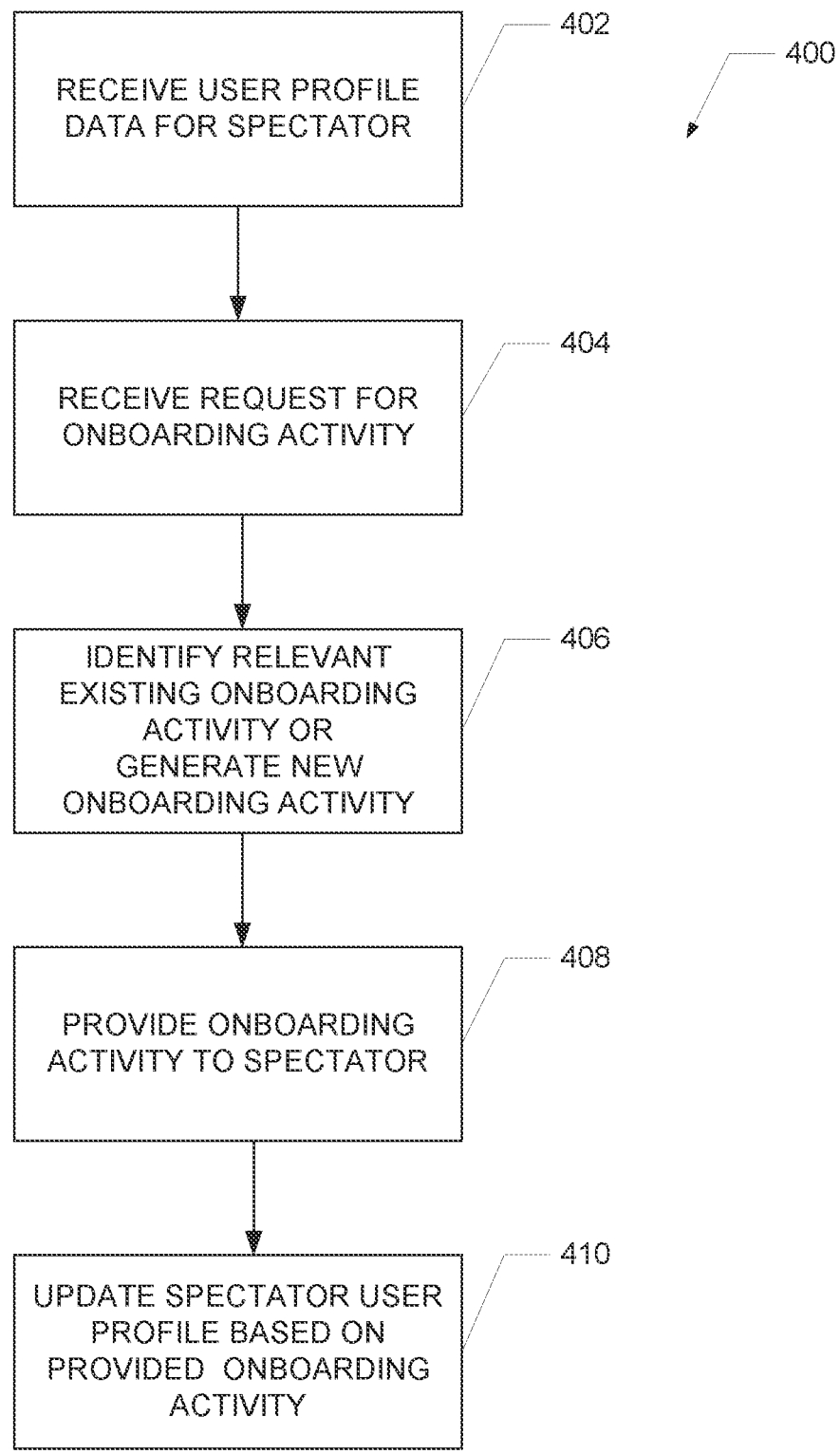
FIG. 4 is a flowchart illustrating an exemplary method for providing an onboarding activity to an eSports spectator.

FIG. 4 is a flowchart illustrating an exemplary method 400 for providing onboarding activities 500A-E to eSports spectators. The steps identified in FIG. 4 are exemplary and may include various alternatives, equivalents, or derivations thereof including but not limited to the order of execution of the same. The steps of the method 400 and any alternative similar processes may be embodied in hardware or software including a computer-readable storage medium including instructions executable by the likes of a processor in a computing device. The exemplary process illustrated in FIG. 4 may be performed repeatedly during the use of an entertainment system.

In step 402, data from a spectator's user profile is retrieved by the eSports onboarding module 360. The user profile data may include information on historic profile use of an entertainment system, such as the user device 200, games played, or activities of the user on the user device 130. User profile data may include legacy system data. User profile data may also include information regarding media content and activities previously engaged by the user, such as a record of media content previously engaged by the user, global purchase history of media content from an online store for the user, the purchase history of media content by peers of the user, preferences related to onboarding activities 500A-E from the eSports onboarding module 360, and a record of inputs received from the user of the entertainment device. The user profile may track the interaction and progression of the user with various onboarding activities 500A-E provided by the eSports onboarding module 360 during the streaming of previous eSport events.

In step 404, a request for an onboarding activity 500A-E may be received or otherwise detected by the eSports onboarding module 360. The onboarding activity request may include a spectator making an input at the user device 200, such as pressing one or more buttons on the controller 902, for example. In other examples, onboarding activity requests may include repeated key presses, series of variations on the same combo key presses, verbal requests, input text-based requests, an extended pause of the eSport event stream, and other indicators. In another aspect, an onboarding activity request may be generated in response to a user reaction as interpreted by the user reaction module 330 that may indicate a lack of familiarity or outright confusion with the terminology, gameplay, commentary, player comments, or combinations thereof.

In yet another embodiment, the activity request, at received at step 404, may be generated automatically with or without direct user input at the controller 902. For example, in some embodiments, any combination of hardware sensor data and input data related to software of an entertainment system may be tracked by the eSports onboarding module 360 to identify user confusion. For example, during the play of a game, a user may fail to complete an activity within the game. During a user failure to complete an in-game activity, a user may be recorded by a camera and may be recognized as looking down at a controller or input device. Simultaneously to the camera recording a user, the eSports onboarding module 360 may detect a user has not input any command to the controller or input device. Such a combination of camera data and input data may signify a user is frustrated and may be confused how to operate a device or perform an activity and may require education related to the game or input device.

Upon detection of confusion from the user, the eSports onboarding module 360 may override preferences in the user profile regarding education content that the user previously terminated. The eSports onboarding module 360 may display education content with additional steps and greater detail than the education content that the user had previously exited.

In step 406, an eSports onboarding module 360 may identify an existing onboarding activity 500A-E or generate a new activity in response to the onboarding activity request. When no data is present in the user profile related to a prior onboarding activity 500A-E, the eSports onboarding module 360 may identify or generate a high-level or broad-based tutorial regarding the eSport event that the spectator is viewing. Further, this initial tutorial may be further narrowed, if the spectator's user profile indicates that they may be familiar with the genre but not the specific game title. If the spectator is already familiar, with the genre or a related game title (e.g. a prequel), the onboarding activity may be interrupted by the spectator to identify a particular topic of interest more accurately, such as specific game or level objectives, a dictionary, an encyclopedia, or a character index related to the game played. In some embodiments, the eSports onboarding module 360 may generate an overlay menu displayed at the spectator's user device 200 that contains a filtered set of onboarding activities, thereby allowing the user to access different educational onboarding content.

The onboarding activities 500A-E may range greatly in scope, from general game overview or walkthroughs s to very specific detailed activities regarding a specific level, playable character, non-player characters ("NPCs"), weapon(s), or game environments. In other embodiments, the onboarding activities may include standalone mini-games or playable game sequences of game titles related to the eSports event. The onboarding activities may also be categorized based on user experience or knowledge level, such that new users may be presented with more basic and explanatory information while more experienced or advanced users may be presented with more nuanced and strategic information. User experience may be identified or inferred from user profiles, level and type of gameplay or interaction, quizzes, etc.

In various embodiments, the onboarding activity relates to a tutorial regarding in-game objectives, narratives, characters, mechanics, and/or strategies. This may be presented as an overlay containing tips when the stream for the eSport event is loading or during breaks in the action, including but not limited to any commercial breaks.

Figure 5:
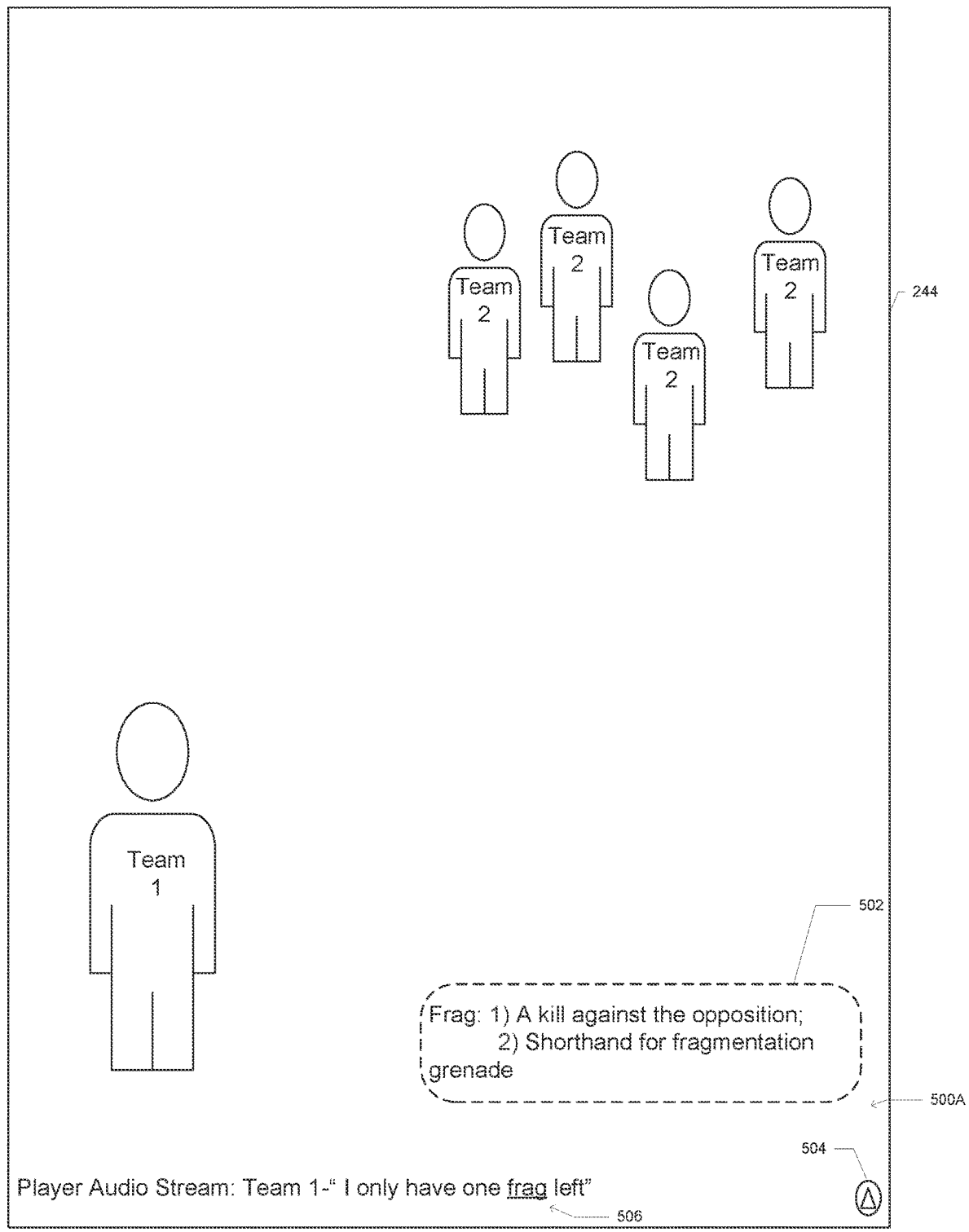
FIG. 5 is an illustration of an onboarding activity as displayed to an eSports spectator, according to one embodiment.

In one embodiment, as shown in FIG. 5, the onboarding activity 500A generated by the eSports onboarding module 360 includes a displayed pop-up or overlay 502 that defines words and terms common to the game title, the game genre, or perhaps eSport events in general. In one aspect, the spectator may request the onboarding activity 500A by pressing a particular button 504 on the controller 902. In response, the eSports onboarding module 360 provides the definition for the term most likely to be misunderstood. In other aspects, the spectator may highlight a particular term 506 to be defined by the onboarding activity.

In another embodiment, the requested definition may be provided as an audio clip so as to not obscure the gameplay. In one aspect, the overlay 502 may be displayed in response to a spectator reaction whether directly requested or based on a request generated by spectators facial or body-language reaction. The terminology and definitions found in the overlay may be selected and retrieved from a stored game dictionary or lexicon.

Alternatively, the overlay may contain definitions and explanations for words or phrases uttered by players and commentators in real-time. As such, the eSports onboarding module 360 may work in conjunction with the machine learning module 390 to decipher and provide definitions for any contemporary terminology, including slang and internet slang.

In another embodiment, as shown in FIG. 6, the onboarding activity 500B is presented as a mini-game. In one example, the mini-game onboarding activity 500B is presented as a game-related trivia game 602, in which spectators may test their game knowledge. In various aspects, the spectators may complete the trivia alone at their own pace or the spectator may compete amongst other spectators viewing the same eSport event.

Figure 7:
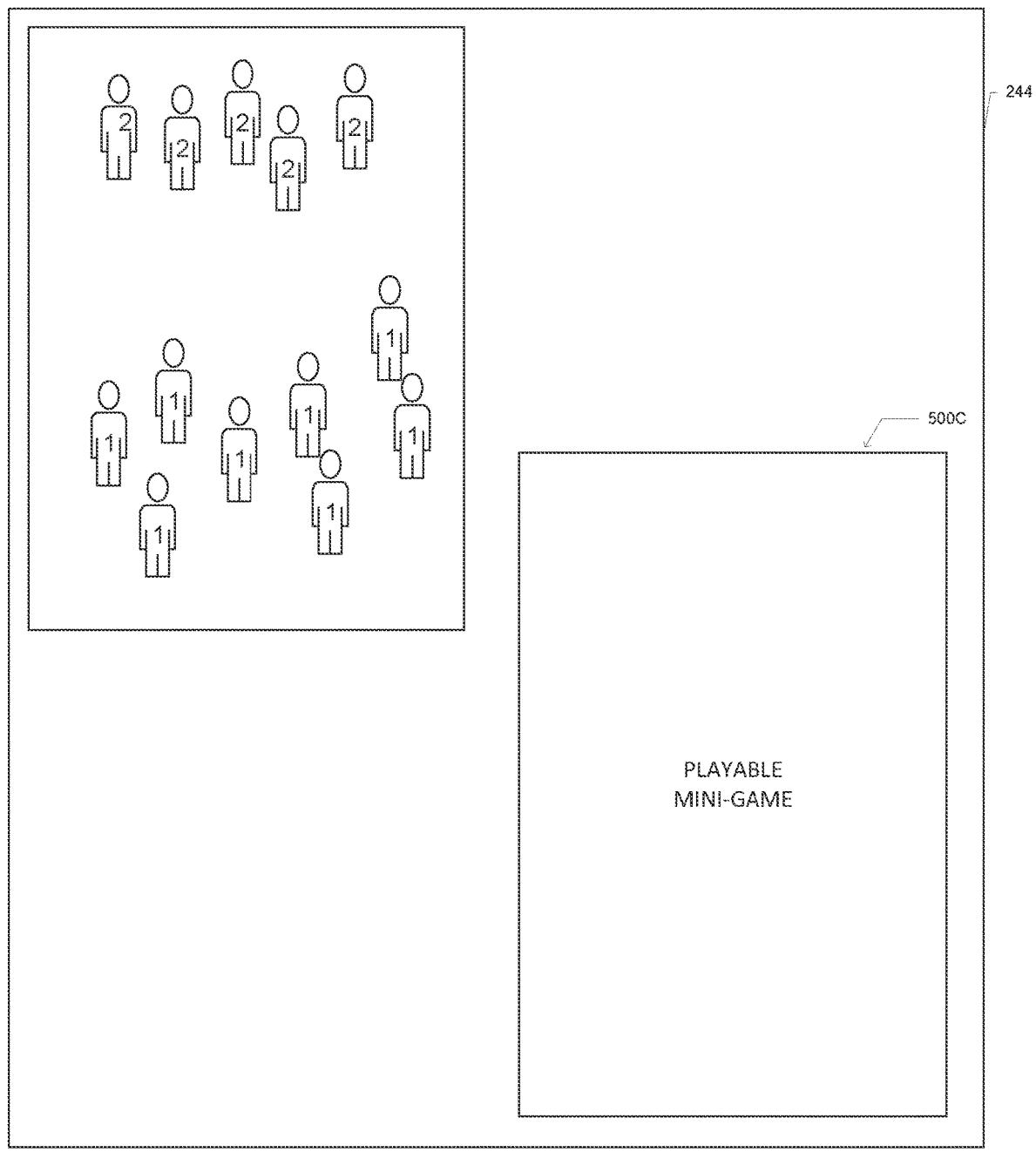
FIG. 7 is an illustration of an onboarding activity as displayed to an eSports spectator, according to one embodiment.
Figure 8:
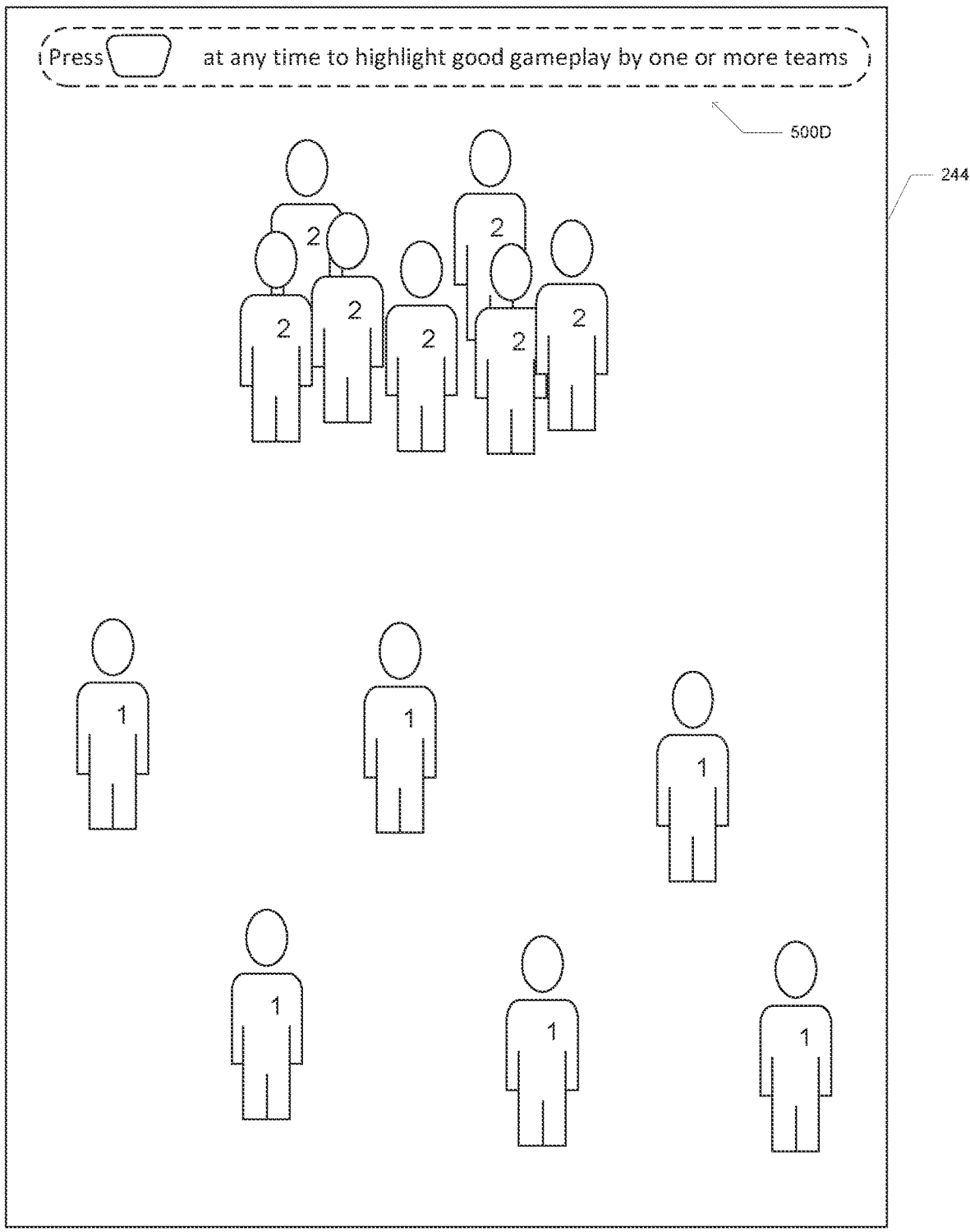
FIG. 8 is an illustration of an onboarding activity as displayed to an eSports spectator, according to one embodiment.

In yet another example, shown in FIG. 7, an onboarding activity 500C is presented as a playable mini game that allows the spectator to play through a simple scenario or sequence of the game as played in the eSport event. For example, in order to educate spectators on how particular weapons effect the sprinting ability for a playable character, the onboarding activity allows the spectator to play as a game character and sprint with a variety of weapons through a straightaway or an obstacle course. This mini-game may be composed from stored game assets. In other examples, other features, tricks, or tips of the game may be taught using mini-games composed of game assets. In various aspects, the mini-games may be stand-alone games not ordinarily found in the game played during the event. Alternatively, the mini-games may be selected from portions or levels of the game itself.

In yet another example, the onboarding activity mini-game may be configured to require the spectator identify sequences of good strategy or gameplay executed by the eSport players during the event. In one aspect, the onboarding activity 500D is available throughout the eSport event and may be running in the background or as a persistent overlay throughout the event stream. During the eSport event, the eSport onboarding module 360 may work in conjunction with the machine learning module 390 to evaluate gameplay sequences and tactics of the current event using datasets comprising historic gameplay from the game and even similar games in the same game genre. In various aspects, the machine learning module may evaluate and assign scores to the current and historic gameplay sequences and tactics.

In various aspects, the spectator may identify or flag and assign an evaluation score to sequences of good or exemplary strategy and gameplay in near real time during the event. In another aspect, the onboarding activity 500D is presented with video clips of previous gameplay and allows the spectator to select a more effective strategy. In various embodiments, upon successfully identifying a good sequence or strategy, or completing other onboarding mini-games, the spectator may be rewarded with an in-game reward (e.g. power-up, additional health, weapons, skins, etc.) for use when the spectator plays the associated game in the future. Similarly, the completion of other onboarding activities may be incentivized with in-game rewards to further engagement and onboarding by the spectators.

In yet another aspect, the onboarding activity may provide a virtual walkthrough to the spectator to instruct them on how to perform an action observed during the eSport event. For example, upon watching an eSport player perform a sequence of actions to reload a weapon while simultaneously using a consumable in-game item, the spectator may request education regarding the controller input sequence used to make the observed actions. In this example, the onboarding activity includes an exemplary controller input guide, as shown in FIG. 9, that may be provided as part of personalized onboarding education. An onboarding activity request may include indications that a user is unfamiliar with an input device, such as a game controller (e.g., repeated incorrect key presses). In one embodiment, a user may operate a controller to manipulate camera angle and move a game-related avatar in a playable mini-game environment. The onboarding activity 500E may provide a visual representation of a user operating a controller 902 to perform a function of gameplay concurrent with active gameplay or training, such as tilting a left analog stick to the right to move an avatar to the right in a game world and tilting a right analog stick to the left to change camera angle to the left orbiting around an avatar. A visual representation 904 may first simulate the required input by a user on-screen 906 and display an example of an avatar and a camera being operated separately and in tandem. The visual representation 904 may then track a user input to display to a user when the training is performed correctly by altering the on-screen display for controller input based on actual user input to a controller 902.

In step 408, the eSports onboarding module 360 provides and or displays the onboarding activity 500A-E to the spectator. In various embodiments, the onboarding activity may include one or more prompts displayed to the spectator that may require further input to begin the activity 500A-E, suspend the activity, or disable the display of future onboarding activities.

In step 410, the spectator's user profile may be updated based on the initiated and/or completed onboarding activity 500A-E generated by the eSports onboarding module 360. Based on the type of onboarding activity 500A-E provided and the outcome, the user profile may be updated regarding the completion of the activity and a user preference for the proficiency or affinity towards the particular onboarding activity 500A-E.

According to various embodiments, the steps 402-408 may be repeated by the eSports onboarding module 360 each time the spectator views an eSport event, including resuming or restarting a streamed eSport event. The eSports onboarding module 360 may automatically cease providing onboarding activities 500A-E upon detection that the spectator has viewed a number of eSport events for the same game or same genre that exceeds a threshold. Alternatively, the eSports onboarding module 360 may resume or generate new onboarding activities when the spectator streams an eSport event that uses different competition rules, or the game has undergone significant revisions.

The foregoing detailed description of the technology herein has been presented for purposes of illustration and description. It is not intended to be exhaustive or to limit the technology to the precise form disclosed. Many modifications and variations are possible in light of the above teaching. The described aspects were chosen in order to best explain the principles of the technology and its practical application to thereby enable others skilled in the art to best utilize the technology in various aspects and with various modifications as are suited to the particular use contemplated. It is intended that the scope of the technology be defined by the claim.

What is claimed is:

1. A method for engaging and onboarding a spectator of an eSport event on an entertainment device; the method comprising:
   receiving user data associated with a use by the spectator use of the entertainment device from a stored user profile;
   receiving an onboarding activity request sent over a communication network from the entertainment device;
   predicting user preferences using a machine-learning model based on the stored user profile;
   based on the predicted user preferences, generating an onboarding interactive activity associated with the onboarding activity request wherein the onboarding interactive activity includes digital content that educates the spectator about an aspect of the eSport event;
   providing the onboarding interactive activity over the communication network to the entertainment device; and
   storing data in memory associating the onboarding interactive activity with the user profile, wherein the machine-learning model is further trained on the stored data.

2. The method of claim 1, wherein the onboarding activity request comprises receiving at least one of a manual input or a verbal input from the entertainment device.

3. The method of claim 1, wherein the onboarding activity request comprises tracking at least one of facial expressions, hand gestures, and body language of the spectator.

4. The method of claim 1, wherein providing the onboarding interactive activity to the entertainment device further comprises:
   identifying a word or phrase spoken by an eSport player or commentator in a stream of the eSport event; and
   displaying an overlay containing one or more definitions for the word or phrase.

5. The method of claim 1, wherein providing the onboarding interactive activity to the entertainment device further comprises:
   storing a gameplay sequence occurring during the eSport event;
   identifying a characteristic of the stored gameplay sequence;
   generating a question related to the identified characteristic;
   displaying an overlay presenting the question to the spectator; and
   receiving input from the spectator at the entertainment device in response to the question.

6. The method of claim 1, wherein providing the onboarding interactive activity to the entertainment device further comprises:
   accessing stored video game assets;
   generating a playable mini-game tutorial based on the eSport event;
   providing the playable mini-game tutorial to the entertainment device; and
   storing data regarding completion or failure to complete the mini-game to the user profile.

7. The method of claim 1, wherein providing the onboarding interactive activity to the entertainment device further comprises:
   storing a gameplay sequence occurring during the eSport event;
   identifying a characteristic of the gameplay sequence;
   evaluating the characteristic of the gameplay sequence and assigning an evaluation score to the gameplay sequence;
   receiving an input from the spectator at the entertainment device identifying at least a portion of the gameplay sequence;
   receiving a spectator evaluation score of the portion of the gameplay sequence from the spectator at the entertainment device;
   determining if spectator evaluation score corresponds to the assigned evaluation score;
   wherein if the spectator evaluation score matches the assigned evaluation score, then awarding the spectator with an in-game reward; and
   storing the data regarding the in-game reward in the user profile.

8. A system for engaging and onboarding a spectator of an eSport event on an entertainment device; the system comprising:
   a server having memory and a processor that executes instructions stored in memory, wherein execution of the instructions by the processor causes the server to:
   receive user data associated with a use by the spectator use of the entertainment device from a stored user profile;
   receive an onboarding activity request from the entertainment device;
   predict user preferences using a machine-learning model based on the stored user profile;
   based on the predicted user preferences, generate an onboarding interactive activity associated with the onboarding activity request wherein the onboarding interactive activity educates the spectator about an aspect of the eSport event;
   provide the onboarding interactive activity to the entertainment device; and
   storing data associating the onboarding interactive activity with the user profile, wherein the machine-learning model is further trained on the stored data.

9. The system of claim 8, wherein the onboarding activity request causes the processor to receive at least one of a manual input or a verbal input from the entertainment device.

10. The system of claim 8, wherein the onboarding interactive activity request causes the processor to track at least one of facial expressions, hand gestures, and body language of the spectator.

11. The system of claim 8, wherein to provide the onboarding interactive activity to the entertainment device further comprises the processor to:
- identify a word or phrase spoken by an eSport player or commentator in a stream of the eSport event; and
- display an overlay containing one or more definitions for the word or phrase.

12. The system of claim 8, wherein providing the onboarding interactive activity to the entertainment device further comprises the processor to:
- store a gameplay sequence occurring during the eSport event;
- identify a characteristic of the stored gameplay sequence;
- generate a question related to the identified characteristic;
- display an overlay presenting the question to the spectator; and
- receive an input from the spectator at the entertainment device in response to the question.

13. The system of claim 8, wherein providing the onboarding interactive activity to the entertainment device further comprises the processor to:
- access stored video game assets;
- generate a playable mini-game tutorial based on the eSport event;
- provide the playable mini-game tutorial to the entertainment device; and
- store data regarding completion or failure to complete the mini-game to the user profile.

14. The system of claim 8, wherein providing the onboarding interactive activity to the entertainment device further comprises the processor to:
- store a gameplay sequence occurring during the eSport event;
- identify a characteristic of the gameplay sequence;
- evaluate the characteristic of the gameplay sequence and assigning an evaluation score to the gameplay sequence;
- receive an input from the spectator at the entertainment device identifying at least a portion of the gameplay sequence;
- receive a spectator evaluation score of the portion of the gameplay sequence from the spectator at the entertainment device;
- determine if spectator evaluation score corresponds to the assigned evaluation score;
- wherein if the spectator evaluation score matches the assigned evaluation score, then the processor to award the spectator with an in-game reward; and
- store the data regarding the in-game reward in the user profile.

15. A non-transitory computer-readable storage medium having embodied thereon a program, the program being executable by a processor to perform a method for engaging and onboarding a spectator of an eSport event on an entertainment device; the method comprising:
- receiving user data associated with a use by the spectator use of the entertainment device from a stored user profile;
- receiving an onboarding activity request from the entertainment device;
- predicting user preferences using a machine-learning model based on the stored user profile;
- based on the predicted user preferences, generating an onboarding interactive activity associated with the onboarding activity request wherein the onboarding interactive activity educates the spectator about an aspect of the eSport event;
- providing the onboarding interactive activity to the entertainment device; and
- storing data associating the onboarding interactive activity with the user profile, wherein the machine-learning model is further trained on the stored data.

16. The non-transitory computer-readable storage medium of claim 15, wherein the onboarding activity request comprises receiving at least one of a manual input or a verbal input from the entertainment device.

17. The non-transitory computer-readable storage medium of claim 15, wherein the onboarding activity request comprises tracking at least one of facial expressions, hand gestures, and body language of the spectator.

18. The non-transitory computer-readable storage medium of claim 15, wherein providing the onboarding interactive activity to the entertainment device further comprises:
- identifying a word or phrase spoken by an eSport player or commentator in a stream of the eSport event; and
- displaying an overlay containing one or more definitions for the word or phrase.

19. The non-transitory computer-readable storage medium of claim 15, wherein providing the onboarding interactive activity to the entertainment device further comprises:
- storing a gameplay sequence occurring during the eSport event;
- identifying a characteristic of the gameplay sequence;
- generating a question related to the identified characteristic;
- displaying an overlay presenting the question to the spectator; and
- receiving input from the spectator at the entertainment device in response to the question.

20. The non-transitory computer-readable storage medium of claim 15, wherein providing the onboarding interactive activity to the entertainment device further comprises:
- accessing stored video game assets;
- generating a playable mini-game tutorial based on the eSport event;
- providing the playable mini-game tutorial to the entertainment device; and
- storing data regarding completion or failure to complete the mini-game to the user profile.

21. The non-transitory computer-readable storage medium of claim 15, wherein providing the onboarding interactive activity to the entertainment device further comprises:
- storing a gameplay sequence occurring during the eSport event;
- identifying a characteristic of the gameplay sequence;
- evaluating the characteristic of the gameplay sequence and assigning an evaluation score to the gameplay sequence;
- receiving an input from the entertainment device identifying at least a portion of the gameplay sequence;
- receiving an input from the spectator at the entertainment device identifying at least a portion of the gameplay sequence;
- receiving a spectator evaluation score of the portion of the gameplay sequence from the spectator at the entertainment device;
- determining if spectator evaluation score corresponds to the assigned evaluation score;

wherein if the spectator evaluation score matches the assigned evaluation score, then awarding the spectator with an in-game reward; and storing the data regarding the in-game reward in the user profile.

* * * * *